Dec. 14, 1965     C. A. HEUER     3,222,763
METHOD OF MAKING A HOLLOW ARTICLE
Filed Feb. 26, 1960

INVENTOR.
CHARLES A. HEUER
BY
ATTORNEYS

United States Patent Office 3,222,763
Patented Dec. 14, 1965

3,222,763
METHOD OF MAKING A HOLLOW ARTICLE
Charles A. Heuer, East Alton, Ill., assignor to Olin Mathieson Chemical Corporation, East Alton, Ill., a corporation of Virginia
Filed Feb. 26, 1960, Ser. No. 11,224
2 Claims. (Cl. 29—157.3)

This invention relates to hollow sheet metal articles and more particularly to the method of manufacturing hollow articles, such as heat exchangers and the like, of sheet metal.

In the well known process of fabricating hollow panels such as refrigerator heat exchangers and the like, as fully disclosed in a patent to Grenell, U.S. 2,690,002, granted on September 28, 1954, a pattern of weld-inhibiting or stop-weld material is applied to a clean surface of a sheet of metal. A clean surface of a second sheet of metal is superimposed on this surface and the two sheets secured together, to prevent relative movement between each other, and then welded together by hot rolling in the adjacnt areas thereof which are not separated by the weld-inhibiting material. Hot rolling of the sheets results in reducing the thickness of the two sheets and elongating the resultant blank in the direction of rolling while the width of the resultant blank remains substantially the same as the intial width of the sheets. Following the hot rolling operation, the resultant blank is usually softened as by annealing to make it more pliable and if desired it may then be cold rolled and again softened as by annealing. The weld-inhibiting material results in an unjoined portion between the outer surfaces of the blank. After softening the blank, the unjoined portion is expanded by injecting therein a fluid pressure of sufficient magnitude to permanently distend the blank in the area of the unjoined portion to form the desired pattern of passageways.

In the expansion of a panel obtained by the process of the aforesaid patent, it is often desirable to control the distention of complementary portions of the component sheets defining the unjoined portion so that one of the complementary portions is expanded to a substantially greater degree or extent than its other complementary portion, or by leaving the aforesaid other complementary portion substantially undistended.

It has been proposed to fabricate such panels from different component metal sheets, such as different alloys, having differentiable physical properties in their annealed state, pressure welding the two sheets together by the process of the aforementioned patent to Grenell to the ultimate dimensions desired and then annealing the composite panel to soften it, and thus, make it more amenable to inflation. Subsequent to annealing, a fluid pressure is injected into the unjoined interior portion of the panel of a magnitude below the elastic limit or yield strength of the harder sheet but above the elastic limit or yield strength of the softer sheet, whereupon the portions of the softer sheet defining the unjoined portion are expanded while the corresponding portions of the harder sheet defining the unjoined interior portion remain substantially undeformed or expanded a relatively very small degree. However, in annealing such a composite panel, both component sheets of the composite panel are softened so as to induce in the component sheets the natural physical properties they have at the specific temperature of the anneal, including the physical properties the component sheets have in their fully annealed state. In this respect such as process suffers a disadvantage in that it is limited in the degree of differentiation that can be established between the physical properties of the component sheets employed in fabricating the composite panel.

Also additional disadvantages are involved in such a process due to the difference in the physical characteristics, of the different metal component sheets, during mechanical working of the panel subsequent to the pressure welding operation, such as in the aforementioned patent to Grenell, resulting in a weld between the component sheets. As is well known, as for example in U.S. Letters Patent 2,707,323 and 2,446,891, when working a composite panel formed of different metal component sheets, such as a hard and a soft component sheet by rolling, the gauge reduction of each sheet is different as a result of the difference in the physical properties particularly the ductility, or plasticity, of the individual component sheets. Thus, the softer sheet tends to elongate more during rolling to gauge while the harder sheet resists elongation. Since the softer sheet is unified by welding to the harder sheet, such difference in the tendency to elongate causes a strain at the pressure weld between the sheets further inducing a tendency for the weld between the sheets to burst. Also, such difference in elongation between the softer and harder sheet causes the composite panel to distort into a curved configuration and to follow one of the rolls, adjacent the harder sheet, with the harder sheet disposed on the inside or interior of the curve and with the softer sheet on the outside or exterior of the curve. Such a configuration requires additional processing, such as roller or stretcher leveling, in order to remove the curve condition and straighten the panel into its desired planar form.

Accordingly, it is an object of this invention to provide a novel process for the manufacture of hollow articles eliminating disadvantages of the prior art.

Another object of this invention is to provide a novel process for fabricating composite articles of different metals with minimum of deformation of the panel during mechanical working due to their difference in physical properties.

Another object of this invention is to provide a novel process for fabricating hollow sheet metal articles by mechanical working of a composite panel with a minimum of deformation of a panel during fabrication due to their difference in physical properties.

A further object of this invention is to provide a novel process of fabricating hollow sheet metal articles from a panel formed as a result of a unification of different metal component sheets by increasing the ratio between the physical properties of the component sheets in order to control the degree of subsequent expansion of complementary portions of the component sheets defining the hollow of the article.

A still further object of this invention is to provide a novel process for the working of a hollow composite metal panel to induce greater ratios between the physical properties of the component sheets comprising the panel in order to control the degree of expansion desired in the complementary portions of the component sheets defining the hollow of the panel.

It has been discovered that in composite panels obtained by the unification of component sheets of different alloys of the same base metal which have different ductilities such as by the process of the aforementioned patent to Grenell, greater ratios between the physical properties of the component sheets, and accordingly, their ductilities can be obtained by a simplified mechanical working of the blank or panel while eliminating complicated heat treating operations. Generally, the invention involves taking the aforesaid panel, after the unification of the component sheets but prior to additional mechanical reductions, and heating it to an elevated temperature above the recrystallization temperatures of the component sheets, and then while said panel is at a temperature above the recrystallization temperatures, of the component sheets, rolling the panel to gauge at a rate such that the panel is discharged from the rolling operation at a temperature between the recrystallization temperatures of the components sheets. By this invention the panel at final gauge has a greater ratio between the physical properties of the component sheets than if they were both in an annealed state. Such reduction to gauge in accordance with this invention results in a composite panel in which the softer or more ductile component sheet, having the lower yield strength, will be substantially at or slightly above its annealed condition whereas the harder or less ductile component sheet, having the higher yield strength, will be discharged in a partially work hardened condition with a substantial increase in its physical properties, particularly its yield strength. Thus, the panel by rolling to gauge in accordance with this invention results in an induced greater ratio between the physical properties of the component sheets to provide a greater degree of distention or deformation in the softer or more ductile component sheet relative to the harder or less ductile sheet in comparison to the condition obtained in such a panel if both of the component sheets were in their fully annealed state, or where both said component sheets have been work hardened to the same degree.

In addition, the resultant blank obtained in accordance with the above makes possible, upon expansion, a novel configuration in the radial cross-sectional configuration of the tubular passages obtained to render the hollow article more resistant to damage and penetration while still obtaining maximum volumetric capacity in the tubular passages. As brought out in the patent to Long, U.S. 2,662,273, in order to obtain maximum volumetric capacity in the hollow panels obtained by processes such as disclosed in the aforementioned patent to Grenell, the panel is expanded between spaced apart rigid surfaces with fluid pressures of magnitudes above the bursting pressures of the hollow and sufficiently high to expand the unjoined portions of the panel against the rigid surfaces into flat-topped passages of substantially hexagonal configuration. However, in such a hexagonal configuration, the deformed walls of the tubular passages present extend surfaces and edges susceptible to damage with objects impacted against them or by sharp instruments. This problem is conventionally known in the refrigeration industry as "ice pick damage" and was a formidable one involving extensive research for solution.

This novel configuration of this invention is obtained by expanding the panel between spaced apart rigid surfaces with fluid pressure at a magnitude sufficient to expand the hard component sheet, having the higher elastic limit, into an arcuate configuration with its crest contiguous with the rigid surface adjacent to it while simultaneously expanding the soft component sheet, with the lower elastic limit, into a three-sided semi-hexagonal flat-topped configuration against the flat surface adjacent to it. In this manner the harder sheet which has the higher elastic limit, and which forms the supporting surface in the ultimate use of the expanded panel, is bulged into an arcuate configuration presenting a bulged surface with greater ability for the deflection of sharp objects and the like, and thus, minimize ice pick damage.

The manner in which the above objects and other objects and advantages are obtained will become more apparent from the following description and drawings in which.

Figure 1:
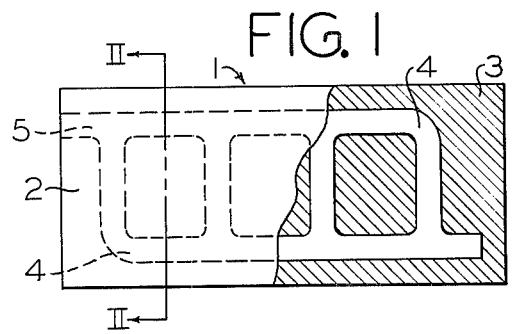
FIGURE 1 is a plan view partly in section of a hollow pressure welded blank obtained in accordance with the process of the aforementioned patent to Grenell employed to illustrate various embodiments of this invention.
Figure 2:
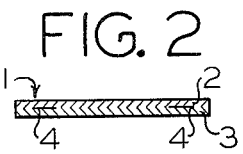
FIGURE 2 is a cross-sectional view taken along lines II—II of the blank illustrated in FIGURE 1.
Figure 3:
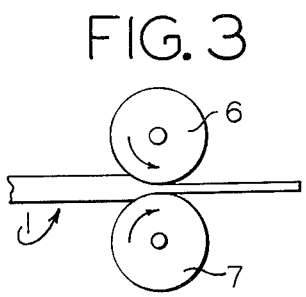
FIGURE 3 is an elevational view illustrating the mechanical working of the blank of FIGURE 1 in accordance with the embodiments of this invention.
Figure 4:
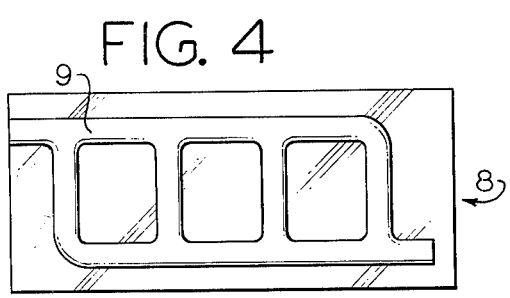
FIGURE 4 is a plan view illustrating an expanded panel obtained in accordance with the embodiments of this invention from the blank illustrated in FIGURE 1.
Figure 5:
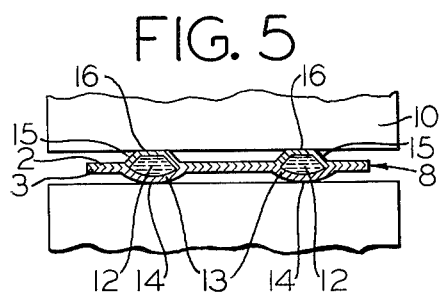
FIGURES 5 and 5A are cross-sectional views illustrating a novel configuration obtained in a hollow and expanded panel in accordance with one of the embodiments of this invention.
Figure 5A:
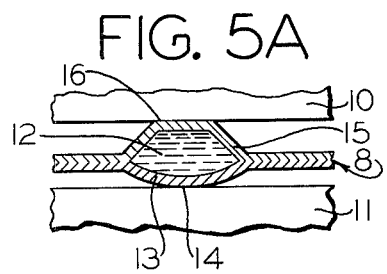

Referring to the drawings, FIGURE 1 illustrates a pressure welded panel 1 obtained from component sheets 2 and 3 in accordance with the aforesaid patent to Grenell, U.S. No. 2,690,002, and having internally disposed between the component sheets a pattern of separation 4 adapted for expansion by a fluid pressure to form a corresponding desired fluid passageway system disposed within the panel. As will be understood, the configuration 4 employed in this embodiment merely represents a simple tube design for convenience which, however, may take any complicated or complex configuration as is well understood in the art.

By way of example, panel 1 was fabricated by the unification of metal sheets of different aluminum alloys with component sheet 2 of a 1100 type aluminum alloy, in accordance with the Aluminum Association's standard designation, and with component sheet 3 of a 3004 type aluminum alloy, in accordance with the aforesaid standard designations. In the fabrication of this panel either component sheet 2 or component sheet 3 has applied to it a pattern 4 of stop-weld material corresponding to the desired tubular system of passageways, and the other component sheet is superimposed on the first sheet so as to sandwich the pattern between them and the pair of superposed sheets are pressure welded in accordance with the process in the aforesaid patent to Grenell. As illustrated in FIGURE 1, this pattern of stop-weld is adapted so as to provide in the pressure welded blank either prior to or subsequent to trimming an inlet 5 for insertion of a suitable nozzle, not shown, through which a fluid pressure is injected into the unwelded portions of the blank resulting from the interposition of the stop-weld material between the adjacent surfaces of the superposed sheets. For example, to pressure weld the pair of superposed sheets, comprised of 1100 and 3004 aluminum type alloys, they were heated to between 900° F. and 950° F. and rolled at elevated temperatures between a pair of mill rolls to at least a 65% uniform reduction in thickness whereupon the adjacent surfaces not separated by the stop-weld material became unified or welded together.

Subsequent to the pressure welding operation, or immediately prior to ultimate reduction of blank 1 to final gauge, the blank is heated above the recrystallization temperatures of both the 1100 and 3004 aluminum type alloys and further reduced to gauge by hot rolling between a pair of mill rolls 6 and 7 to the dimensions desired. And, further in accordance with this invention, the rate of rolling is such that the elongated blank, at the desired gauge, discharged from the rolls is at a temperature between the recrystallization temperature of the 1100 aluminum alloy and the recrystallization temperature of the 3004 type aluminum alloy. Generally, the temperature of the elongated blank upon discharge from mill rolls 6 and 7 after elongation will be, for the 1100 and 3004 type aluminum alloys, in the range from about 520° F. to about 620° F. with the optimum range extending from about 570° F. to about 580° F.

Such treatment in accordance with the above results in a final blank in which its 1100 type aluminum component sheet is in a greater annealed state than the 3004 type aluminum alloy. In practice, it has been found that the 1100 type aluminum alloy will be essentially in its complete annealed state or 0-temper whereas the 3004 type aluminum alloy will be substantially work hardened. This produces a composite blank in which the component sheets have a greater ratio between their physical properties, particularly in their elastic limits, than if they were both in their annealed or 0-temper state. It will be understood the term "elastic limits" is employed in this application in its accepted sense to define a maximum stress that a material will withstand without permanent deformation, and in its practical sense is used interchangeably with the term "yield strength."

As will be understood, the rate at which blank 1 is elongated to its desired gauge as indicated above will be such as to discharge the elongated panel in the above described temperature range and will be necessarily dependent and controlled by the heat transfer effects of the mills which include the peripheral speed of the rolls and the extent to which they are cooled, as for example by cooling solutions.

By way of illustration, tabulated below are the physical properties obtained in the 1100 and 3004 type aluminum alloys, of the composite panel, upon elongation of the panel 1 in accordance with this invention in comparison to the physical properties that are obtained in these aluminum alloys be conventional methods requiring softening of the component sheets, by annealing, prior to expansion with fluid pressure.

PHYSICAL PROPERTIES OF THE COMPONENT SHEETS ROLLED TO FINAL GAUGE IN ACCORDANCE WITH THIS INVENTION

| Aluminum | Tensile Strength, p.s.i. | Yield Strength, p.s.i. | Elongation, percent |
| --- | --- | --- | --- |
| Alloy 1100 | 12,900 | 7,750 | 30 |
| Alloy 3004 | 26,600 | 17,620 | 10 |

PHYSICAL PROPERTIES OF COMPONENT SHEETS IN THEIR ANNEALED OR 0-TEMPER

| Aluminum | Tensile Strength, p.s.i. | Yield Strength, p.s.i. | Elongation, percent |
| --- | --- | --- | --- |
| Alloy 1100 | 13,000 | 5,000 | 35 |
| Alloy 3004 | 26,000 | 10,000 | 20 |

Comparison of the physical properties tabulated above shows that a composite panel was obtained in accordance with this invention in which the 1100 type aluminum alloy was essentially in its annealed condition with the 3004 type aluminum alloy having substantial work-hardened physical properties. This composite panel was expanded with fluid pressure into a panel 8 having the desired system of tubular passages 9 extending internally within the expanded panel 8. Any magnitude of fluid pressure may be employed to form the expanded panel extending from a value merely sufficient to deform only the softer component sheet, for example 1100 type aluminum alloy, but insufficient to deform the other harder component sheet, such as 3004 type aluminum alloy, or the magnitude of the expanding fluid pressures employed may be such to permanently deform both component sheets. In this alternate method of expansion the softer alloys, for example the 1100 type aluminum alloy, is expanded to a substantially greater extent than the corresponding portions of the harder alloy, such as the 3004 type aluminum alloy, since the softer alloy substantially is in its annealed or 0-temper state whereas the harder alloy retains the effects of work hardening imparted during the reduction of the panel to the desired gauge.

Preferably to obtain the novel configuration of the tubular passages with increased resistance to ice pick damage, the blank 1 after elongation in accordance with this invention is positioned between a pair of platens 10 and 11 having opposed rigid surfaces spaced apart an amount equal to the amount of expansion desired, in the tubular passages, out of opposite faces of the blank. As for example, the rigid surfaces may be spaced from each other a distance of 0.130 inch. After the blank 1 is positioned between the platens 10 and 11 a fluid 12 is injected into the unwelded portions of the panel under sufficient pressure, as for example 1700 p.s.i. for this specific example, to expand the harder component sheet, having the higher elastic limit or yield strength, into an arcuate configuration 13 with its crest 14 adjacent and contiguous the rigid surface of platen 11 while expanding the other component sheet, having the lower elastic limit or yield strength, into a three-sided semi-hexagonal configuration 15 having one side 16 forming a flat-topped crest of the passages and extending in the plane substantially parallel with the face of the blank out of which it is expanded or bulged.

Preferably, in accordance with another embodiment of this invention, a composite panel of different aluminum alloys is heated, prior to rolling to final gauge, above the recrystallization temperatures of the different aluminum component sheets to an elevated temperature of about 900° F. and with respect to the panel comprised of 1100 type and 3004 type aluminum alloys, preferably from about 950° F. to about 1000° F., whereat the ductility or plasticity of both component sheets is essentially the same. The composite sheet at the elevated temperature is then rolled between mill rolls whereby substantially the same degree of elongation is obtained in both component sheets to produce a relatively flat sheet without curvature or bowing. As discussed above, the increased ratio between the component sheets is obtained by discharging the elongated blank from the mill rolls at a temperature between the recrystallization temperatures of the component sheets followed by expansion in accordance with the procedure discussed in the embodiment above.

As will be understood other combinations of metals may be processed in accordance with this invention, for example various combinations of aluminum alloys such as a composite panel fabricated by pressure welding a sheet of 1100 type aluminum alloy to a sheet of 6061 type aluminum alloy. Also, although the invention has been described with respect to hollow pressure welded panels obtained in accordance with the aforementioned patent to Grenell, the invention is equally applicable to other composite panels devoid of any internal patterns of separation.

Accordingly, although the invention has been described with respect to various embodiments, materials, and details, various modifications and changes will be apparent to one skilled in the art. Therefore, the invention is not to be limited by such embodiments, materials and details except as set forth in the appended claims.

What is claimed is:

1. In the fabrication of a hollow article from a composite panel comprised of two unified metal components with one of said two component sheets of substantially the same thickness being 1100 type aluminum alloy and the other of said two component sheets being 3004 type aluminum alloy and having internally disposed within said panel a pattern of separation adapted for expansion by fluid pressure to form a corresponding desired fluid passageway system, the method comprising heat treating said panel at a temperature of at least 900° F. to fully anneal said aluminum alloys; hot rolling said panel between mill rolls to the desired elongation with said panel being at a temperature of at least 900° F. upon entry between said rolls and being discharged from said rolls at a temperature within the range from about 520° F. to about 600° F.; and injecting into said pattern of separation within said panel said fluid pressure of sufficient magnitude to expand said pattern of separation into said desired fluid passageway system whereby said 1100 aluminum alloy sheet is expanded to a substantially greater extent than the corresponding portion of said 3004 aluminum alloy sheet.

2. In the fabrication of a hollow article from a composite panel comprised of two unified metal components with one of said two components sheets of substantially the same trickness being 1100 type aluminum alloy and the other of said two component sheets being 3004 type aluminum alloy and having internally disposed within said panel a pattern of separation adapted for expansion by fluid pressure to form a corresponding desired fluid passageway system, the method comprising heat treating said panel at a temperature in the range from about 950° F. to 1000° F.; hot rolling said panel between mill rolls to the desired elongation with said panel being at a temperature in the range from about 950° F. to about 1000° F. upon entry between said rolls and being discharged from said rolls at a temperature in the range from about 570° F. to about 580° F.; and injecting into said pattern of separation within said panel said fluid pressure of sufficient magnitude to expand said pattern of separation into said desired fluid passageway system whereby said 1100 aluminum alloy sheet is expanded to a substantially greater extent than the corresponding portion of said 3004 aluminum alloy sheet.

References Cited by the Examiner

UNITED STATES PATENTS

| | | | |
|---|---|---|---|
| 2,821,772 | 2/1956 | Billetter | 29—157.3 |
| 2,934,322 | 4/1960 | Hazard | 257—256 |
| 2,940,737 | 6/1960 | Sandberg | 257—256 |
| 2,949,664 | 8/1960 | Pauls | 29—157.3 |
| 2,966,728 | 1/1961 | Balfour | 29—157.3 |
| 2,966,729 | 1/1961 | Dedrick | 29—157.3 |
| 2,984,902 | 5/1961 | Bothmann | 29—498 |
| 3,036,369 | 5/1962 | Wilkins | 29—423 |
| 3,108,361 | 10/1963 | Neel | 29—157.3 |
| 3,114,202 | 12/1963 | Wenger | 29—157.3 |

WHITMORE A. WILTZ, *Primary Examiner.*

HERMAN BERMAN, RAY K. WINDHAM, *Examiners.*